United States Patent [19]

Christianson et al.

[11] 4,172,804

[45] Oct. 30, 1979

[54] METHOD OF PREPARING FIRE RETARDANT INSULATION

[76] Inventors: George Christianson, 18210 30th Place N., Wayzata, Minn. 55391; John D. Pollock, Suite 203, 6566 France Ave. S., Edina, Minn. 55435; William R. Freischel, 5621 Minnetonka Blvd., Minneapolis, Minn. 55416

[21] Appl. No.: 853,289

[22] Filed: Nov. 21, 1977

[51] Int. Cl.$^2$ .......................... C04B 43/00; C09K 3/28
[52] U.S. Cl. ...................................... 252/62; 252/8.1; 423/277; 427/390 D
[58] Field of Search .............. 427/390 D; 252/62, 8.1; 423/277

[56] References Cited

U.S. PATENT DOCUMENTS

| | | | |
|---|---|---|---|
| 1,612,678 | 12/1926 | Vivas | 427/390 D |
| 1,723,989 | 8/1929 | Balduf | 252/62 |
| 2,147,793 | 2/1939 | Kropp | 252/62 |
| 2,470,641 | 5/1949 | Portz | 252/62 |
| 2,746,841 | 5/1956 | Taylor | 423/277 |
| 3,027,326 | 3/1962 | Moffett | 252/62 |
| 3,259,104 | 7/1966 | Gerber | 252/62 |

OTHER PUBLICATIONS

Kirk–Othmer, Encyclopedia of Chemical Technology, 2nd Edition, vol. 3, p. 615, 1963.
Anderson, "Boric Acid Future in Insulation Uncertain" C & EN, Apr. 10, 1978, pp. 11 to 13.

*Primary Examiner*—John D. Smith
*Attorney, Agent, or Firm*—Dorsey, Windhorst, Hannaford, Whitney & Halladay

[57] ABSTRACT

A method of preparing fire retardant cellulosic fiber insulation which includes the steps of reacting borax with a source of hydrogen ions such as sulfuric acid or various other acids or acid salts in an amount sufficient to convert at least about 20% of the borax into boric acid and a sodium salt and then mixing the resulting composition with a cellulosic fiber base.

12 Claims, No Drawings

METHOD OF PREPARING FIRE RETARDANT INSULATION

BACKGROUND OF THE INVENTION

The present invention relates generally to a fire retardant composition for use in the preparation of cellulosic insulation, and more specifically, to a method for preparing fire retardant cellulosic insulation utilizing, among other things, a mixture of borax and a source of hydrogen ions.

Borax, borates, boric acid and various other derivitives of boron have been used as fire retardant agents in the preparation of fire resistant compositions and products for many years. Specifically, various mixtures of boric acid and borax have been used and currently are being used by many in the preparation of cellulosic insulation to render the same fire retardant. Although mixtures of boric acid and borax have been shown to be one of the best means for preparing fire retardant cellulosic insulation, there are several reasons why such mixtures are not universally used in the insulation industry. First, and most importantly, although there appears to be plenty of available borax, boric acid and the grade and purity presently used in the preparation of insulation is in extremely short supply. In fact, many cellulosic insulation manufacturers have found it necessary to limit production or to convert to other chemicals or processes because there is simply not enough boric acid to go around. Secondly, as a result of the shortage of available boric acid and the high demand in recent years for insulation, the cost of the boric acid is quite high. This high cost, of course, is passed directly on to the consumer. Accordingly, there is a real need for a cellulosic insulation product which has acceptable fire resistancy, but which does not utilize boric acid as an initial ingredient in its preparation.

SUMMARY OF THE INVENTION

In contrast to the prior art, the present invention relates to a method of preparing fire retardant cellulosic insulation which does not utilize boric acid as an initial ingredient. In general, the present invention involves reacting borax or sodium borate ($Na_2B_4O_7$) with a source of hydrogen ion causing at least a portion of the borax to be converted into, among possible other things, boric acid and a sodium salt, adjusting the pH of the resulting mixture to an acceptable level and then combining the same with a material of cellulosic base to produce insulation in a manner presently known in the art. It is believed that the source of hydrogen ions can be provided by various compounds including, among others, acids such as sulfuric acid ($H_2SO_4$), hydrochloric acid (HCl), phosphoric acid ($H_3PO_4$), and nitric acid ($HNO_3$) or acid salts such as sodium acid sulfate ($NaHSO_4$), potassium acid sulfate ($KHSO_4$), sodium acid sulfite ($NaHSO_3$), etc. The inventors have found, however, that a source of hydrogen ions in the form of sulfuric acid or sodium acid sulfate is particularly effective in the present process because the sodium salt in the resulting composition (specifically sodium sulfate) is believed to have certain fire retardant characteristics. This further enhances the fire resistance of the resulting insulation product. Sulfuric acid is also desirable because it is substantially void of water even though it is in liquid form. Accordingly, the resulting product formed by reaction between sulfuric acid an borax is dry. On the other hand, reaction between borax and nitric or hydrochloric acid results in a wet or liquid product due to the presence of water in the acids.

The pH of the composition formed by combining borax with the source of hydrogen ions is then adjusted to an acceptable level. This may be done by using specific quantities of borax and the hydrogen ion source which when combined will give a composition with the desired pH or by adding an appropriate compound such as aluminum sulfate [$Al_2(SO_4)_3$] in quantities sufficient to obtain the desired pH. This resulting Composition is then mechanically mixed with shredded cellulosic fiber material, after which the product is packaged and marketed as a fire retardant insulation product.

Various flame spread tests have been conducted on this resulting insulation product. These tests have been shown the fire resistance of such product to be within acceptable levels and comparable to the fire retardancy of cellulosic insulation prepared by using conventional mixtures of borax and boric acid.

As will be shown in the description below and as stated above, one of the main objectives of the present invention is to provide a method for preparing a cellulosic insulation product with acceptable flame resistant capabilities.

Another object of the present invention is to provide a method of preparing cellulosic insulation which has acceptable fire retardant qualities and which does not utilize boric acid as an initial ingredient.

A further object of the invention is to provide a method of preparing fire retardant cellulosic insulation products which utilize materials that are inexpensive and in relatively large supply.

Another object of the present invention is to provide a method of preparing cellulosic insulation involving combining borax with a source of hydrogen ions to convert a portion of the borax into boric acid and a sodium salt.

A still further object of the present invention is to provide a method of preparing cellulosic insulation involving combining borax with a source of hydrogen ions such as sulfuric acid or sodium acid sulfate, adjusting the pH of the resulting composition to a desired level and combining the same with a cellulosic insulation base.

These and other objects of the present invention will become apparent with reference to the description of the preferred method and the appended claims.

DESCRIPTION OF THE PREFERRED METHOD

In general, the method of the present invention of preparing cellulosic insulation includes preparing a fire retardant agent or composition and then combining such agent or composition with a cellulosic fiber base.

Preparation of the fire retardant agent or composition includes reacting quantities of borax and a source of hydrogen ions. Borax, which has the chemical formula $Na_2B_4O_7$ and which is known chemically as sodium borate or sodium tetraborate, can exist in its anhydrous form ($Na_2B_4O_7$), in its pentahydrate or five-mole form ($Na_2B_4O_7 \cdot 5H_2O$) or in its decahydrate or ten-mole form ($Na_2B_4O_7 \cdot 10H_2O$). All forms are available commercially, however, in the preferred method five-mole borax (the pentahydrate form) is utilized.

The five-mole borax is reacted with a source of hydrogen ions which in the preferred method is sulfuric acid ($H_2SO_4$). This mixing step can be accomplished by any conventional mixer which is capable of thoroughly mixing the dry borax material with the liquid sulfuric acid. The inventors have found that various relative quantities of borax and sulfuric acid may be used while still yielding a composition which can be used to prepare cellulosic insulation with acceptable fire retardant qualities. It has been found, however, that preferably, the upper limit of sulfuric acid which should be used in the present procedure is the stoichiometrical amount that will react with all of the borax in the mixture. If an amount higher than the stoiciometrical amount of sulfuric acid is used it is believed that a portion of the sulfuric acid may remain unreacted resulting in a mixture having a slurry or soupy consistency, or that the resulting mixture will be too corrosive for use in an insulation product. The inventors have also found that as a practical limit, the weight percent of sulfuric acid reacted with the borax should be at least about 5% to insure that at least about 20% of the five-mole borax is converted to boric acid and a sodium salt. Accordingly, the initial reaction between borax and sulfuric acid should be with an amount of sulfuric acid no greater than the stoiciometrical amount necessary to react completely with the borax and greater than about 5% by weight.

The stoiciometrical amount of sulfuric acid necessary to react completely with the borax will, of course, vary with the particular form of borax utilized. For anhydrous borax, the stoiciometrical amount of sulfuric acid is approximately 32% as compared with 68% borax. With borax pentahydrate (five-mole borax), the stoiciometrical amount of sulfuric acid is approximately 25% as compared with 75% borax, whereas with borax decahydrate (ten-mole borax), the stoiciometrical amount of sulfuric acid is 20% as compared with 80% borax. All of the above percentages are in weight percentages of sulfuric acid and borax. In the preferred method, substantially pure sulfuric acid is combined with a commercial grade of five-mole borax. Although this borax may contain small amounts of anhydrous and decahydrate borax, depending upon the ambient temperature and moisture conditions, it is comprised predominantly of five-mole borax. Using commercial grade five-mole borax, the inventor has found that between about 10–15% and preferably about 14% sulfuric acid (weight percent) gives acceptable results.

The inventors also believe that in addition to sulfuric acid, various other sources of hydrogen ions could be used. These other sources could be acids such as hydrochloric acid, nitric acid, phosphoric acid, etc. and acid salts such as sodium acid sulfate, potassium acid sulfate, sodium acid sulfite, etc. The source that has worked best, however, is sulfuric acid.

Regardless of the source of hydrogen ion used, its function is to convert at least a portion of the borax to boric acid and a sodium salt of the hydrogen ion source. It has been determined that at the minimum, the quantity of hydrogen ion source should be sufficient to convert at least 20% of the available borax to boric acid and a sodium salt. When sulfuric acid is used as the hydrogen ion source, it is generally considered that a portion of the borax is converted into boric acid ($H_3BO_3$) and sodium sulfate ($Na_2SO_4$). However, in actuality, there will also likely be a combination of several types of borate and sulfate salts in various forms.

The next step in the preparation of the fire retardant composition is the adjustment of the pH to the desired level. This may be accomplished by combining borax and the source of hydrogen ions in quantities sufficient to give the desired pH or it may be accomplished by addition of another compound such as aluminum sulfate. In the preferred method, it has been found that when sulfuric acid is used as the source of hydrogen ions, a weight percent of sulfuric acid between about 20% and 25% versus a weight percent of borax between about 80% and 75%, respectively, will result in a pH of between about 7.0 and 8.0 which is an acceptable range. Similar determinations can be used for other sources of hydrogen ions.

If it is desired to control or adjust the pH by addition of another material, a compound such as aluminum sulfate may be added. When aluminum sulfate is used, it is believed to serve several functions in the system. First, it is used for pH control. Specifically, it modifies the pH of the hydrogen ion-borax mixture or sulfuric acid-borax mixture to an acceptable level. In this respect it should be noted that an objective of most insulation products is to achieve a pH which results in a non-corrosive material. As mentioned above, it is desirable to keep the pH of the resulting composition between about 7.0 and 8.0 and preferably about 7.5. Therefore, the material added to control or adjust the pH, must be added in sufficient quantities to keep the pH of the resulting composition at these desired levels. The quantities of aluminum sulfate or any other similar material needed for the desired pH control are determined by titration tests and the preparation of a titration curve. Such a titration curve can be prepared by plotting the percentage of aluminum sulfate in a given mixture of borax and hydrogen ions versus the measured pH. In this manner, the amount of aluminum sulfate necessary to adjust the pH to the proper level can be determined. The titration curve for the preferred composition (14% sulfuric acid and 86% borax) shows that aluminum sulfate should be added in an amount (based upon weight percent) of between about 20% and 23% and preferably about 22% of the total system weight (sulfuric acid, borax and aluminum sulfate). Therefore, the upper limit of aluminum sulfate (or other compound) which can be used in the present procedure to adjust pH is that amount which does not cause the pH of the mixture to be less than 7.0, while the lower limit is that amount which does not cause the pH of the mixture to be greater than 8.0. The amount of such compound necessary in the system, if any is necessary, will depend upon the relative amounts of the hydrogen ion source and borax which are reacted. In such case, a titration curve should be prepared for the particular mixture being used.

Another function of aluminum sulfate in the present system is to assist in rendering the insulation product fire resistant. Therefore, by using aluminum sulfate, some of the other more expensive elements can be reduced. A further function of the aluminum sulfate is to deter rodents and other animals from chewing or ingesting the insulation product.

Following reaction between the borax and the source of hydrogen ion and appropriate adjustment of the pH, the product is passed through a grinder or a crusher to pulverize any granules or other particles of an excessive size. In the present method the particles should preferably to ground to 100 mesh or smaller. The fire resistant agent is then ready for mixing with the cellulosic fiber base.

In the present method, the cellulosic fiber insulation base is prepared by first collecting newspapers, magazines or other scrap materials made of cellulosic fibers and then exposing the same to a series of shredding devices and hammermills to cut and pulverize the materials into small pieces. In the preferred method, the initial material is exposed to a conventional paper shredder which shreds the paper into small pieces of approximately one to two square inches. This shredded paper is then exposed to a conventional hammermill to pulverize the paper still further. The paper remains in this first hammermill until the approximate time when the cellulosic fibers begin to separate. This pulverized cellulosic fiber material is then physically mixed in a second hammermill with the fire retardant composition described above. Normally the fire retardant composition is mixed with the cellulosic fiber material in a weight percent of approximately 18%. During this mixing step, the cellulosic fibers are further separated and the chemical composition is mixed with the fibers. It is believed that at least a part of the composition is attracted to the fiber or is physically impregnated or dissolved in the fibers.

At the completion if this mixing step, the mixed components, the fire retardant composition and the cellulosic fiber material, are directed to a packaging bin where the material is packaged for sale.

The inventor has conducted flame spread tests on the insulation product prepared in accordance with the above described invention using various percentages of sulfuric acid and borax. These flame spread tests measure the rate at which the flame advances along a sample of the insulation product and provides an index or indication of the fire retardant qualities of the resulting insulation product. The flame spread tests for insulation prepared by the present method resulted in readings which compared favorably with the readings from insulation prepared via the conventional method using boric acid and borax.

In order to more fully illustrate the nature of the invention and the manner of practicing the same, the following examples are presented:

EXAMPLE 1

122 pounds of sulfuric acid were reacted with 950 pounds of five-mole borax in a suitable mixing drum until reaction was complete. 300 pounds of aluminum sulfate were then combined with this mixture after which the resulting composition was mixed with a suitable quantity of cellulosic fiber base in a hammermill. Flame spread tests were then conducted on the resulting insulation product. The results showed a pH of approximately 8.1 and a flame spread index of 34.

EXAMPLE 2

160 pounds of sulfuric acid were reacted with 950 pounds of five-mole borax in a suitable mixing drum until reaction was complete. 300 pounds of aluminum sulfate were then combined with this mixture after which the resulting composition was mixed with a suitable quantity of cellulosic fiber base in a hammermill. Flame spread tests were then conducted on the resulting insulation product. The results showed a pH of 7.6 and a flame spread index of 32.

Although the description of the present invention has been quite specific it is contemplated that various modifications could be made to the process without deviating from the spirit thereof. Accordingly, the scope of the present invention should be dictated by the appended claims rather than by the description of the preferred method.

We claim:

1. A method of preparing fire retardant cellulosic insulation comprising:
    reacting a quantity of borax with a source of hydrogen ions in an amount sufficient to convert at least about 20% of the borax into boric acid and a sodium salt, but less than the stoiciometrical amount necessary to react completely with said quantity of borax, the amount of hydrogen ions relative to the quantity of borax further being such as to result in an alkaline composition having a pH between about 7.0 and 8.0;
    pulverizing the resulting composition;
    preparing a cellulosic fiber base by shredding and pulverizing cellulosic materials; and
    directly mixing the resulting composition with said cellulosic fiber base without further purification or processing.

2. The method of claim 1 wherein the source of hydrogen ions is selected from the group consisting of: sulfuric acid, hydrochloric acid, nitric acid, phosphoric acid, sodium acid sulfate, potassium acid sulfate and sodium sulfite.

3. The method of claim 1 wherein the source of hydrogen ions is sulfuric acid and the borax is five-mole borax.

4. The method of claim 3 wherein the amount of sulfuric acid reacted with the borax is at least about 5% by weight.

5. The method of claim 4 wherein the amount of sulfuric acid reacted with the borax is between about 10% and 15% by weight.

6. The method of claim 4 wherein the amount of sulfuric acid reacted with the borax is between about 20% and 25% by weight.

7. The method of claim 1 including mixing a third material with the hydrogen ion source-borax mixture in a quantity sufficient to maintain the pH of said mixture at between 7.0 and 8.0.

8. The method of claim 7 including adding said third material in a quantity sufficient to maintain the pH of said mixture at about 7.5.

9. The method of claim 8 wherein the borax is five-mole borax and the source of hydrogen ions is sulfuric acid and wherein the amount of sulfuric acid relative to said borax is between approximately 10% and 15% by weight.

10. The method of claim 9 wherein said third material is aluminum sulfate.

11. The method of claim 10 wherein said aluminum sulfate is mixed with said sulfuric acid-borax mixture in an amount between approximately 20% and 23% by weight.

12. The method of claim 10 including preparing said cellulosic fiber base by exposing cellulosic materials to a hammermill.

* * * * *